July 21, 1936.   J. W. PHILLIPS   2,048,196
COTTON CHOPPER
Filed Dec. 15, 1934

Inventor
John W. Phillips
By Hardway Cather
Attorneys

Patented July 21, 1936

2,048,196

UNITED STATES PATENT OFFICE 2,048,196

COTTON CHOPPER

John W. Phillips, El Campo, Tex.

Application December 15, 1934, Serial No. 757,695

2 Claims. (Cl. 97—15)

This invention relates to a cotton chopper.

An object of the invention is to provide an agricultural implement particularly designed for chopping cotton or other similar plants from rows in order to thin out the rows and leave only the desired number of plants standing in the row.

Another object of the invention is to provide an implement of the character described having rotatable cutter shafts with cutters thereon and equipped with means for independently driving the shafts, and with means for elevating each shaft independently of the other so that the cutters of either shaft may be rendered inactive at will.

With the above and other objects in view, the invention has particular relation to certain novel features of construction, operation, and arrangement of parts, an example of which is given in this specification and illustrated in the accompanying drawing, wherein:—

Figure 1:
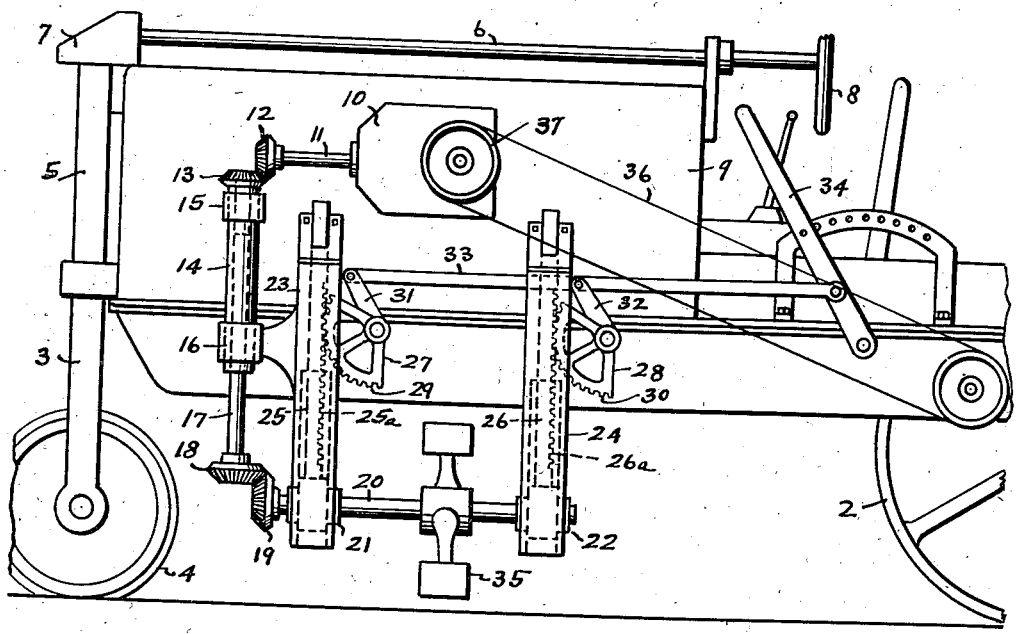
Figure 1 shows a side elevation of the implement partly broken away.
Figure 2:
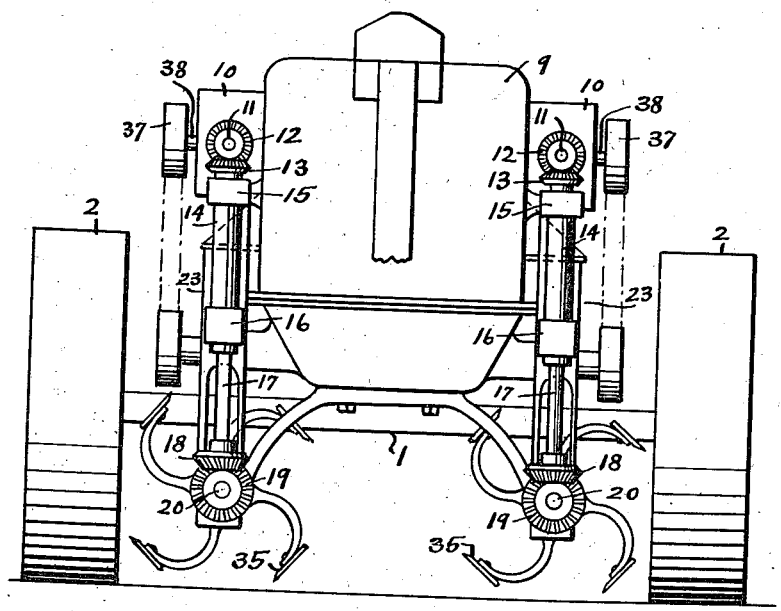
Figure 2 shows a front elevation partly broken away.

In the drawing, the numeral 1 designates the rear axle which is supported by the ground wheels 2, 2. The forward end of the vehicle has the yoke 3 which is supported by the guide-wheel 4 in any conventional manner, and this yoke is preferably formed integrally with the vertical shaft 5 which is geared to the steering shaft 6, the gear connection being contained in a suitable housing 7 and the rear end of the steering shaft has the usual steering wheel 8. The vehicle for supporting the operative mechanism of the chopper may be of any conventional construction and has the usual motor contained within the hood 9. On each side of the hood there is a transmission mechanism enclosed within the transmission housing 10.

Extending forwardly from each transmission mechanism there is a shaft 11 whose forward ends have the beveled pinions 12, 12, fixed thereto and in mesh with similar pinions 13, 13, fastened on the upper ends of the vertical tubular shafts 14, 14. These shafts 14 rotate in suitable upper and lower bearings 15, 16, carried by opposite sides of the vehicle.

Telescoped within the shafts 14 are the shafts 17. These shafts extend beneath the shafts 14 and are freely movable vertically therein and have a splined connection therein.

Fixed to the lower ends of the shafts 17 are the beveled pinions 18, which are in mesh with the corresponding pinions 19 fixed on the forward ends of the shafts 20. These shafts 20 are rotatably mounted in the front and rear bearings 21 and 22 which are vertically movable in the front and rear brackets 23, 24. These brackets are secured to the sides of the vehicle.

Front and rear rack members 25, 26, are attached at their lower ends to their corresponding bearings 21, 22, and these rack members work in vertical bearings in the brackets 23, 24, and their rear faces are formed with the rack faces 25a, 26a.

There are the pivotally mounted rack members 27, 28, which have the arcuate rack faces 29, 30, in mesh with the corresponding faces 25a, and 26a.

The rack members 27, 28, have the upstanding arms 31, 32, whose free ends are pivotally connected to the link 33 and the rear end of this link is pivoted to a hand lever 34 whose lower end, in turn is pivoted to the sides of the vehicle.

When the lever 34 is manipulated rearwardly, the rack members 27, 28, are correspondingly actuated and the rack members 25, 26, are elevated, thus elevating the corresponding shaft 20. When the lever 34 is manipulated forwardly, said rack members 25, 26, and the corresponding shaft 20 will be lowered. As the shaft 20 is moved up and down, the shaft 17 will be moved upwardly and downwardly also.

On each shaft 20 there are a plurality of outwardly extended cutters 35, and as the shafts 20 are rotated, these cutters will be revolved.

The transmission mechanism in a housing 10 may be driven from the driving mechanism of the vehicle through the corresponding belt 36 which operates a corresponding pulley 37 fixed on the shaft 38 which drives the corresponding transmission mechanism.

As the vehicle moves along, the cutters 35 will be driven and as they pass along over the rows they will cut out the surplus plants, leaving those standing at approximately a uniform distance apart.

Either cutter shaft and the cutters carried thereby may be rendered inactive at any time by elevating the same through a suitable manipulation of the lever 34.

The drawing and description disclose what is now considered to be a preferred form of the invention by way of illustration only, while the broad principle of the invention will be defined by the appended claims.

What I claim is:—

1. A cotton chopper comprising a vehicle, a pair of shafts rotatably mounted thereon, radial cutters on the shafts, brackets on each side of the vehicle, bearings vertically movable on the brackets and in which the shafts rotate, means for elevating and lowering the bearings and the shafts carried thereby and means for rotating said shafts, said shaft rotating means comprising vertical, telescopic shafts operatively connected with the cutter shafts.

2. A cotton chopper comprising a vehicle, a pair of shafts rotatably mounted thereon, radial cutters on the shafts, brackets on each side of the vehicle, bearings on opposite sides of the cutters and vertically movable on the brackets and in which the shafts rotate, means for elevating and lowering the bearings and the shafts carried thereby and means for rotating said shafts, said shaft rotating means comprising vertical, telescopic shafts operatively connected with the cutter shafts, and means for driving said vertical shafts.

JOHN W. PHILLIPS.